United States Patent [19]
Woods et al.

[11] Patent Number: 6,037,729
[45] Date of Patent: Mar. 14, 2000

[54] APPARATUS AND METHOD FOR BRAKING ELECTRIC MOTORS

[75] Inventors: Samuel G. Woods, Baltimore; David M. Spampinato, Hampstead; Paul S. White, Ellicott City, all of Md.

[73] Assignee: Black & Decker Inc., Newark, Del.

[21] Appl. No.: 09/014,451

[22] Filed: Jan. 28, 1998

Related U.S. Application Data

[60] Provisional application No. 60/037,732, Feb. 6, 1997, and provisional application No. 60/043,689, Apr. 14, 1997.

[51] Int. Cl.⁷ ........................................... H02P 3/12
[52] U.S. Cl. ........................... 318/375; 318/245; 318/759; 318/781
[58] Field of Search ............................ 318/245, 362–382, 318/759–765, 778–797; 310/50, 210, 158

[56] References Cited

U.S. PATENT DOCUMENTS

| | | |
|---|---|---|
| 2,566,597 | 9/1951 | Cass . |
| 3,983,465 | 9/1976 | Tsuboi et al. . |
| 4,039,914 | 8/1977 | Steigenwald et al. . |
| 4,085,337 | 4/1978 | Moeller . |
| 4,095,151 | 6/1978 | Mourick . |
| 4,354,147 | 10/1982 | Klaussner . |
| 4,422,021 | 12/1983 | Schwarz . |
| 4,555,652 | 11/1985 | Brulard . |
| 4,963,779 | 10/1990 | Lentino et al. ........................... 310/71 |
| 5,063,319 | 11/1991 | Mason et al. . |
| 5,369,343 | 11/1994 | Niemela . |
| 5,424,622 | 6/1995 | Keller et al. . |
| 5,430,261 | 7/1995 | Malone . |
| 5,449,992 | 9/1995 | Geiger et al. . |
| 5,510,583 | 4/1996 | Pescetto . |
| 5,548,196 | 8/1996 | Lim ........................................ 318/254 |
| 5,581,137 | 12/1996 | Lundquist et al. . |
| 5,601,083 | 2/1997 | Boyd et al. . |

*Primary Examiner*—David Martin
*Attorney, Agent, or Firm*—Adan Ayala

[57] ABSTRACT

A braking circuit for braking an electric motor having an armature and run and brake windings, which includes a switching circuit disposed between a source of electrical power and the run winding, this circuit being operable to disconnect the run winding from the source of electrical power. The braking circuit further includes a switching mechanism operable to connect the brake winding in order to brake the electric motor. The switching mechanism preferably connects the brake winding after a predetermined period of time has elapsed from the disconnection of the run winding. This braking circuit can be used in a saw for braking the saw's blade.

30 Claims, 8 Drawing Sheets

APPARATUS AND METHOD FOR BRAKING ELECTRIC MOTORS

This application claims benefit of provisional application Ser. No. 60/037,732 filed Feb. 6, 1997, and Provisional Application Ser. No. 60/043,689 filed Apr. 14, 1997.

FIELD OF THE INVENTION

The present invention relates to apparatus and method for braking electric motors and, particularly, arrangements for braking wound or universal electric motors of the type typically used in power tools and appliances.

BACKGROUND OF THE INVENTION

Electric motors having electro-dynamic braking systems, with our without specific windings, in power tools and appliances are already known. In some tools, such as circular saws, normal unbraked stopping time may be inconveniently long due to the inertia of the motor armature and functional elements such as the circular saw blade.

In typical self-excited dynamic braking systems, release of an "on" switch or trigger simultaneously or sequentially interrupts the flow of electrical power to the tool and effects a reverse of polarity in the windings so that, with the aid of the residual magnetic field in the stator, a self-excited electromagnetic field of force is generated, opposing continued rotation of the motor armature in the original running direction, so that rotation is arrested more quickly than by normal windage and friction.

However, this system only functions if a residual flux level remains in the stator's field. If no residual flux level remains, the self-excited electromagnetic field will not be generated. Braking is then effected by normal windage and friction.

It is an object of this invention to provide an apparatus that guarantees a residual flux level in the stator's field.

SUMMARY OF THE INVENTION

The object is achieved by providing a braking circuit for braking an electric motor having an armature and run and brake windings, which includes a switching circuit disposed between a source of electrical power and the run winding, this circuit being operable to disconnect the run winding from the source of electrical power. The braking circuit further includes a switching mechanism operable to connect the brake winding in order to brake the electric motor. The switching mechanism preferably connects the brake winding after a predetermined period of time has elapsed from the disconnection of the run winding.

Other aspects and advantages of the invention will become apparent from the description and claims which follow.

BRIEF DESCRIPTION OF THE DRAWINGS

The accompanying drawings illustrate preferred embodiments of the invention according to the practical application of the principles thereof, and in which.

DETAILED DESCRIPTION

The invention described below can be implemented on different power tools or appliances. For illustrative purposes, the following description will detail the invention as embodied in a miter saw of overall generally conventional configuration. However, persons skilled in the art should recognize that the invention can be easily implemented within any power tool or appliance which includes a universal electric motor, such as portable circular saws, table saws, drills, drill presses, etc.

Figure 1:
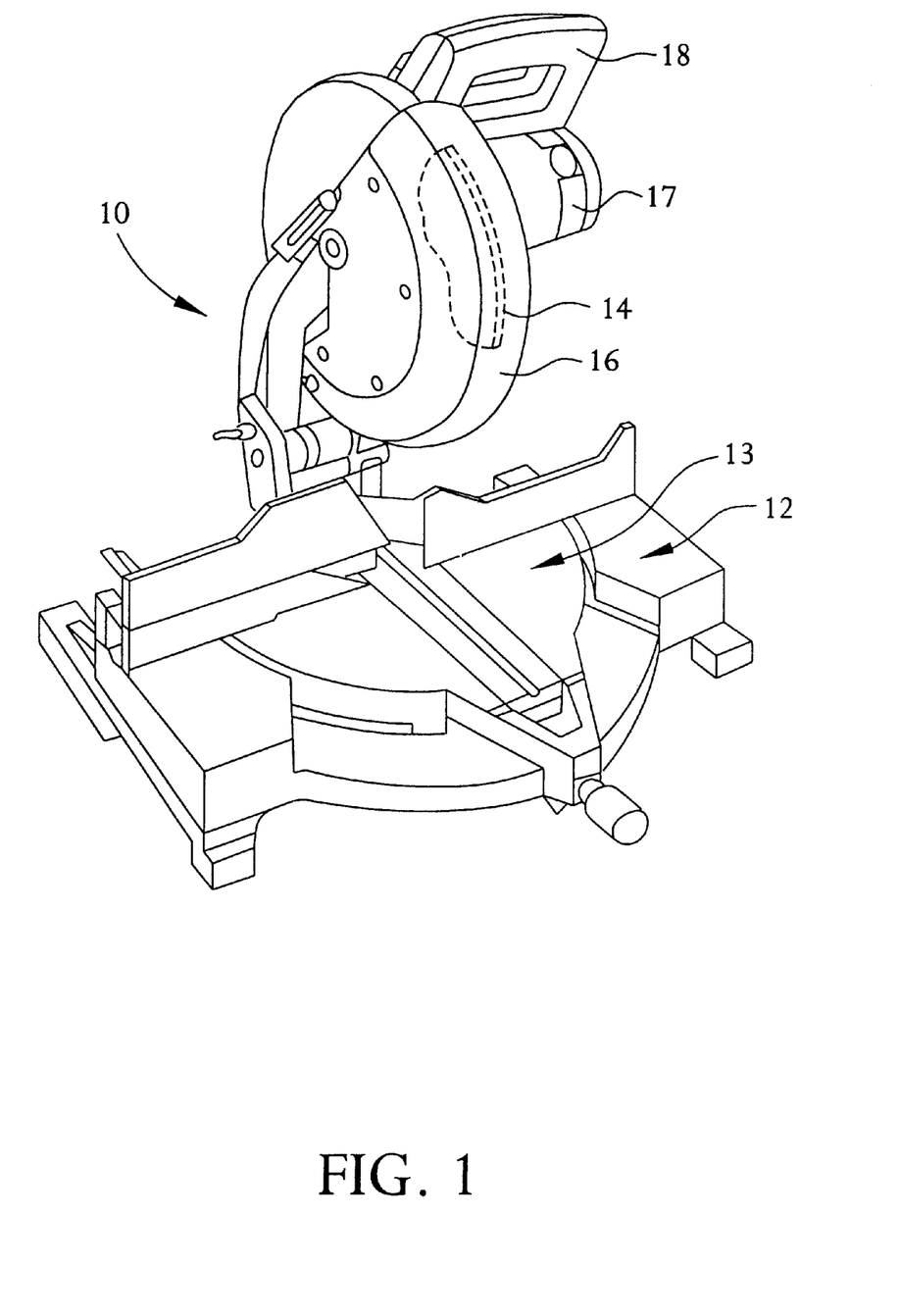
FIG. 1 is a front perspective view of a miter saw in accordance with the present invention.

Referring to FIG. 1, an exemplary miter saw 10 according to the present invention typically includes a base assembly 12, including a table assembly 13 which is preferably rotatable in order to accommodate various cutting modes. The saw 10 also includes a saw blade 14, at least partially enclosed by a blade guard 16 and driven by a motor 17, and a handle 18, which allows the operator to move the saw blade 14 and the blade guard from a clear position free of a workpiece to a cutting position with the saw blade 14 in cutting engagement with the workpiece.

Figure 2:
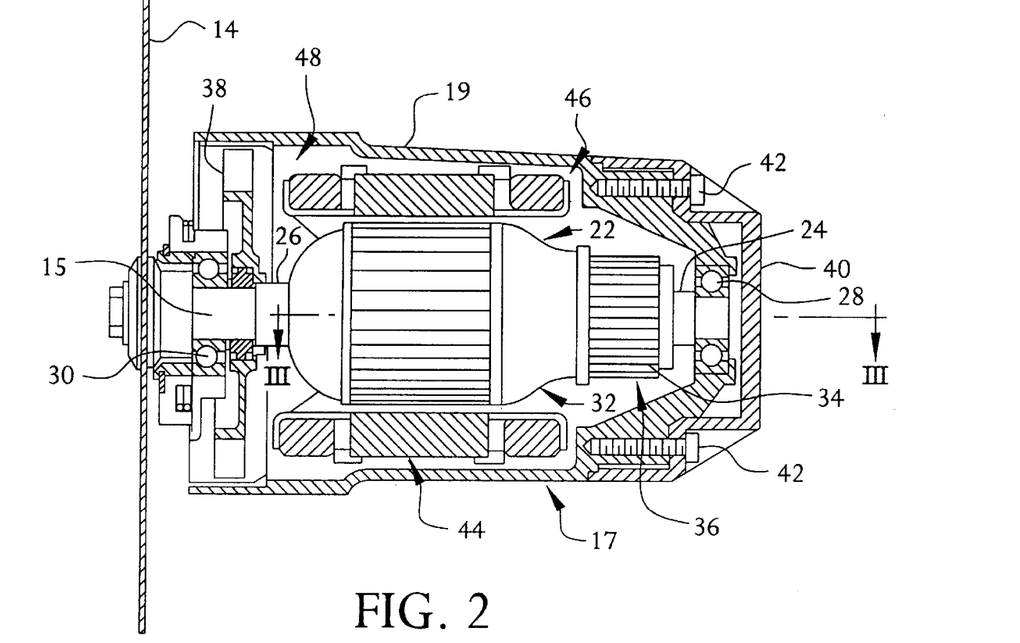
FIG. 2 is a partial cross sectional front view of the miter saw embodying the invention, taken on a vertical plane through the axis of the saw motor and drive shaft.

Referring to FIG. 2, the motor 17 drives the saw blade 14 via a drive shaft 15. Motor 10 and drive shaft 15 are partly housed in a housing 19. An armature 22 is rotatably supported by shaft extensions 24, 26 journaled in bearings 28, 30. A windings portion 32 of the armature 22 includes conventionally arranged armature windings (not shown in detail) conventionally connected to segments or bars 34 of the commutator 36. Armature shaft extension 26 carries and drives an air circulating fan 38. The field case 16 is substantially closed by ventilated end cover 40 attached by screw fasteners 42.

Figure 3:
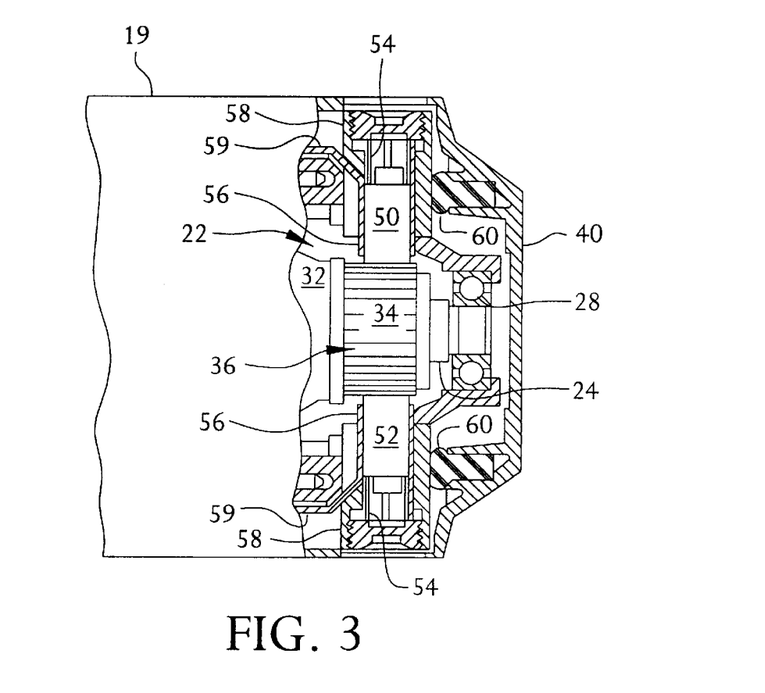
FIG. 3 is a partially broken-out and cross-sectional overhead view of the commutator end of the saw motor taken approximately on line III—III of FIG. 2.

FIG. 3, taken on a horizontal plane through the motor axis, shows additional detail related to the commutator 36. A pair of diametrically opposed brushes 50, 52, each biased by a spring 54, ride on the segments 34 of the commutator 36. Each brush is free to slide radially in its brush holder 56 which in turn is carried by an insulated brush box or housing 58. Electrical connection (not shown in FIG. 3) is made from the brushes to the commutator end 46 of the stator subassembly by brush holder connector member 59. (A similar brush holder and housing arrangement is described in more detail in U.S. Pat. No. 4,963,779, Lentino et al., sharing a common assignee with the present invention). Resilient bolsters 60 help to maintain the axial position and electrical connection of the brush box and brushes relative to the commutator 36 and the commutator end 46 of the stator assembly.

Figure 4:
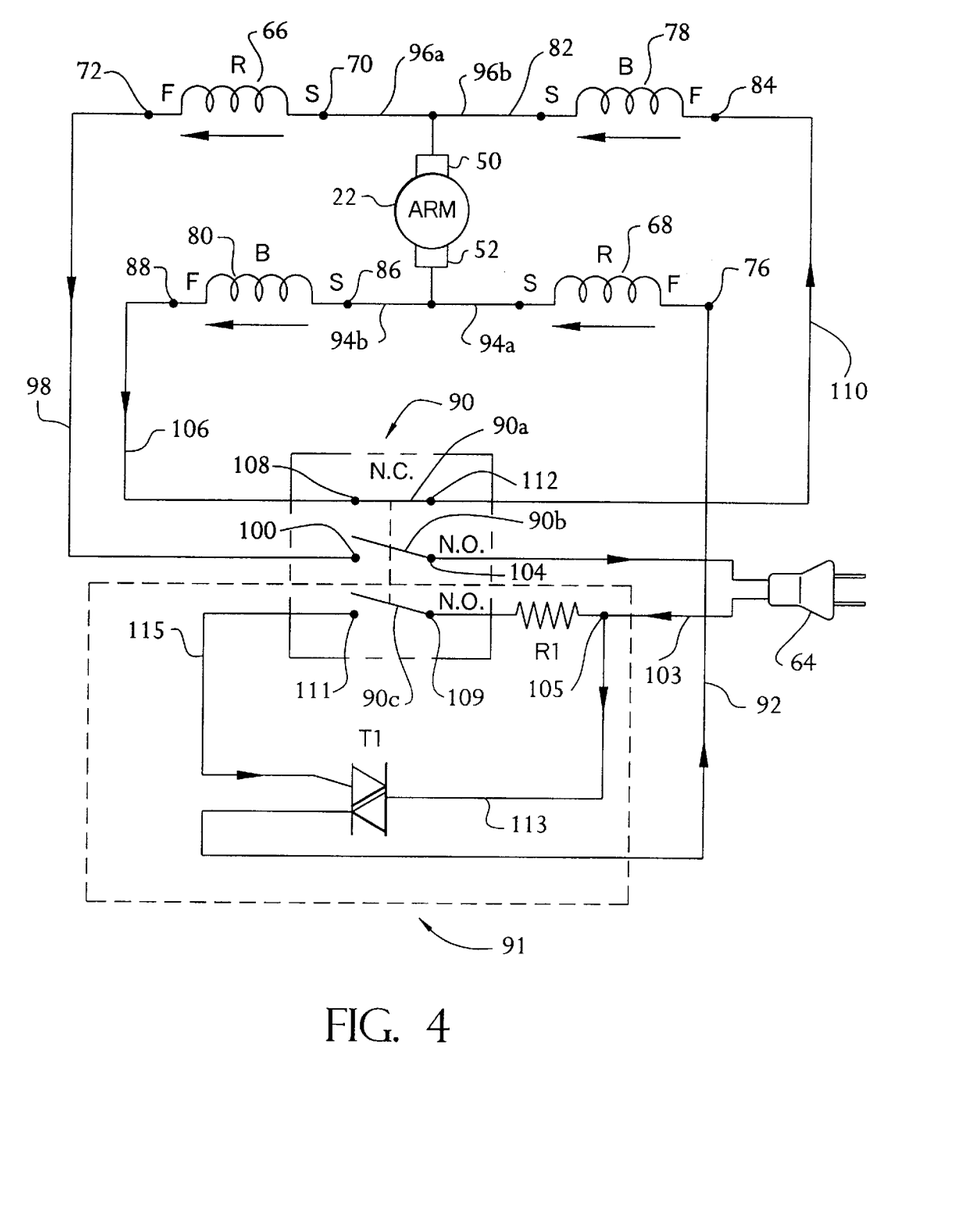
FIG. 4 is a wiring schematic of a first embodiment of the present invention.

As indicated in the wiring schematic of FIG. 4, the saw motor is preferably of the series wound-type, often called universal. Run field windings designated generally by the letter R in the drawings are connectable in series with the armature 22, a conventional source of electrical power 64 and a switching circuit 91, described below. In this embodiment the run winding is split into two portions connected electrically on opposite sides of the armature 22 and comprising first and second run windings 66, 68, respectively, and connected respectively to first and second sides of the armature represented by brushes 50, 52. Each run winding has first and second ends or terminations respectively: 70, 72 for the first run winding 66; and 74, 76 for the second run winding 68.

The motor also includes a secondary field winding provided specifically for a dynamic braking function and designated generally (in FIG. 4) by the letter B. The brake winding B is connectable in shunt across the armature 22. In an arrangement similar to that of the run windings, the brake winding consists of first and second brake field windings 78, 80 connected respectively to the first and second sides of the armature 22 as represented by brushes 50, 52. Each brake field winding 78, 80 has first and second ends or terminations 82, 84 and 86, 88, respectively.

Switching between a run mode and braking mode for the motor may be accomplished by a suitable switching arrangement such as that provided by the motor control switch 90 shown in FIG. 4. Preferably, the motor control switch 90 consists of three single-pole, single-throw switches. The three switches are preferably incorporated in a single body. As shown in FIG. 4, switch 90a is normally closed, while switches 90b and 90c are normally open. Preferably, the three switches are connected together so that they can change states sequentially or simultaneously upon the same throw. A person skilled in the art, however, will recognize that the present invention can be implemented with three separate switches, which may or may not be interconnected.

Motor connections are completed (schematically) by suitable conductors as follows: 92 from the switching circuit 91 to the second run winding second termination 76; 94a and 94b respectively from second run and second brake winding first terminations 74, 86, respectively to the armature 22, second side 52; 96a and 96b from the armature first side 50 respectively to first run and first brake winding first terminations 70 and 82; 98 from the first run winding second termination 72 to switch contact 100; 102 from switch terminal 104 to power supply 64; 103 from the power supply 64 to the switching circuit 91; 106 from switch contact 108 to second brake winding second termination 88; and 110 from first brake winding second termination 84 to switch terminal 112.

Figure 5:
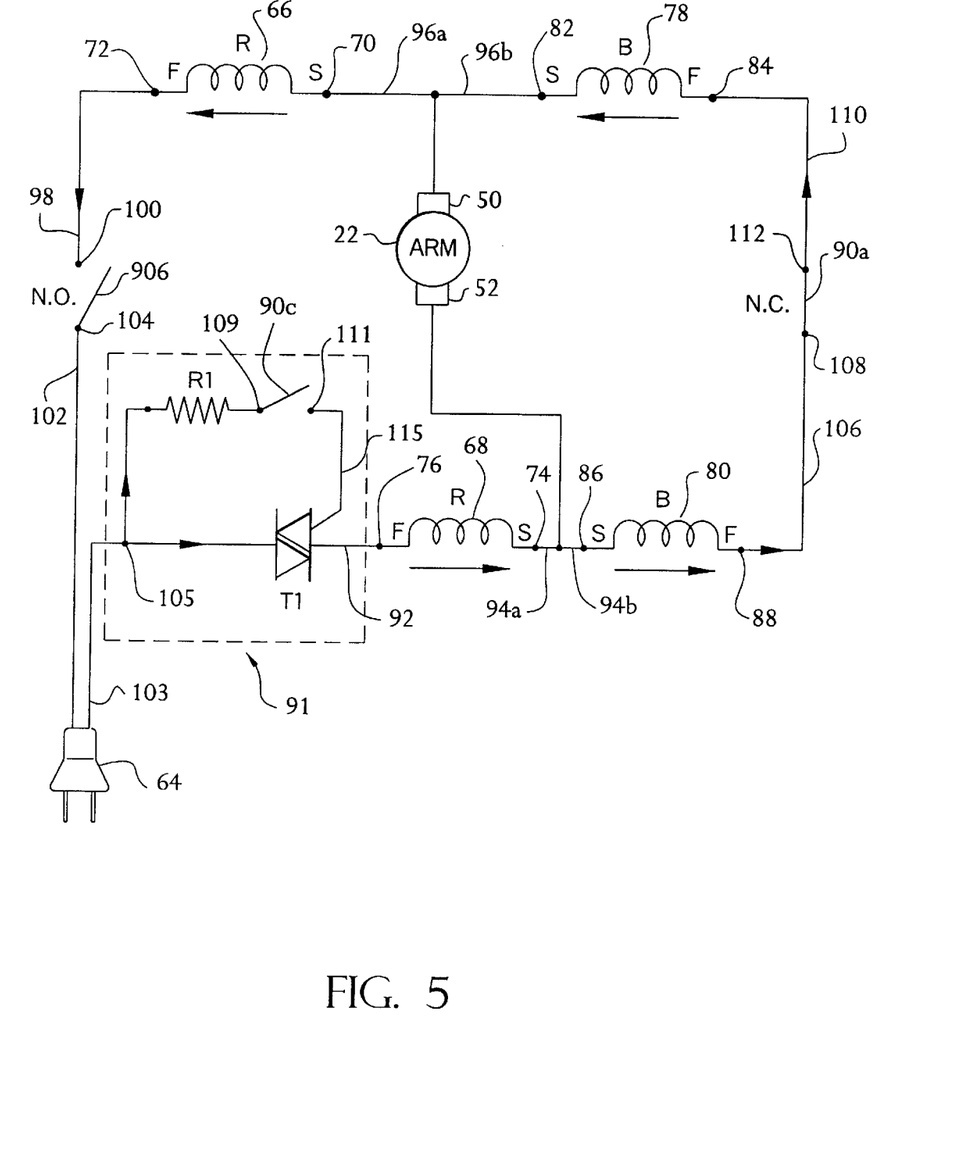
FIG. 5 is an alternate wiring schematic of the first embodiment.

FIG. 5 is the same circuit as shown in FIG. 4. The only difference is that the switches 90a, 90b and 90c have been schematically separated. A person skilled in the art, however, will recognize that the present invention can be implemented with separate switches.

A second embodiment, illustrated in FIG. 5, is very similar to the first in many respects. However, this second embodiment differs from the first in that the first run and brake windings are carried together on a first pole, whereas in the first embodiment the first pole carries the first run and second brake windings (corresponding differences, of course, apply to the respective second poles).

Figure 6:
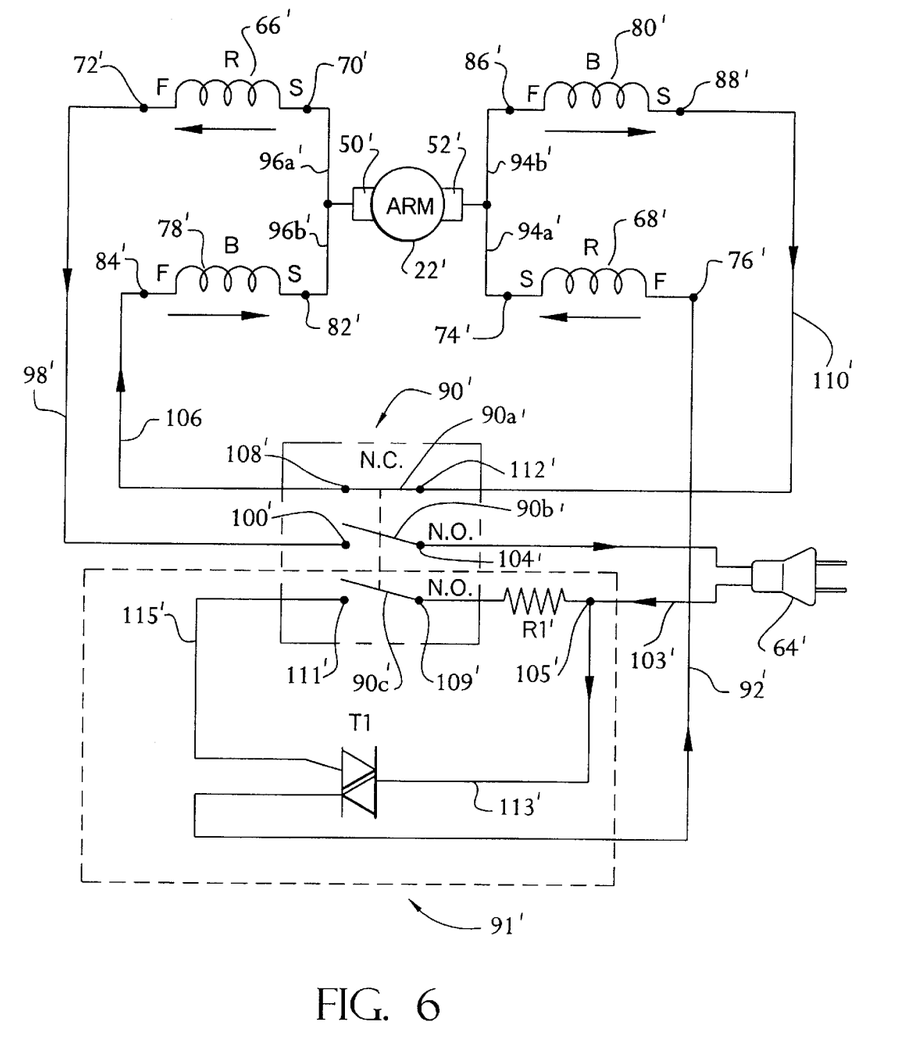
FIG. 6 is a wiring schematic of a second embodiment of the present invention.

Referring to FIG. 6, the first and second run windings 66', 68' are series connected respectively to first and second sides of the armature 22' represented by brushes 50', 52'. Each run winding has first and second ends or terminations respectively: 70', 72' for the first run winding 66'; and 74', 76' for the second run winding 68'.

First and second brake field windings 78', 80' are series connected respectively to the first and second sides of the armature 22' as represented by brushes 50' 52'. Each brake field winding 78', 80' has first and second ends or terminations 82', 84' and 86', 88', respectively.

Preferably, a triple single-pole single-throw motor control switch 90' is used for switching between the run mode and braking mode. Motor connections are completed schematically by suitable conductors as follows: 92' from the switching circuit 91' to second run winding second termination 76'; 94a' and 94b' respectively from second run and second brake winding first terminations 74', 86', respectively to the armature 22; second side 52; 96a' and 96b' from the armature first side 50', respectively, to first run and first brake winding, first terminations 70' and 82'; 98' from the first run winding second termination 72' to switch contact 100'; 102' from switch terminal 104' to power supply 64'; 103' from power supply 64' to switching circuit 91'; 106' from switch contact 108' to first brake winding second termination 84'; and 110' from second brake winding second termination 88' to switch terminal 112'.

Figure 7:
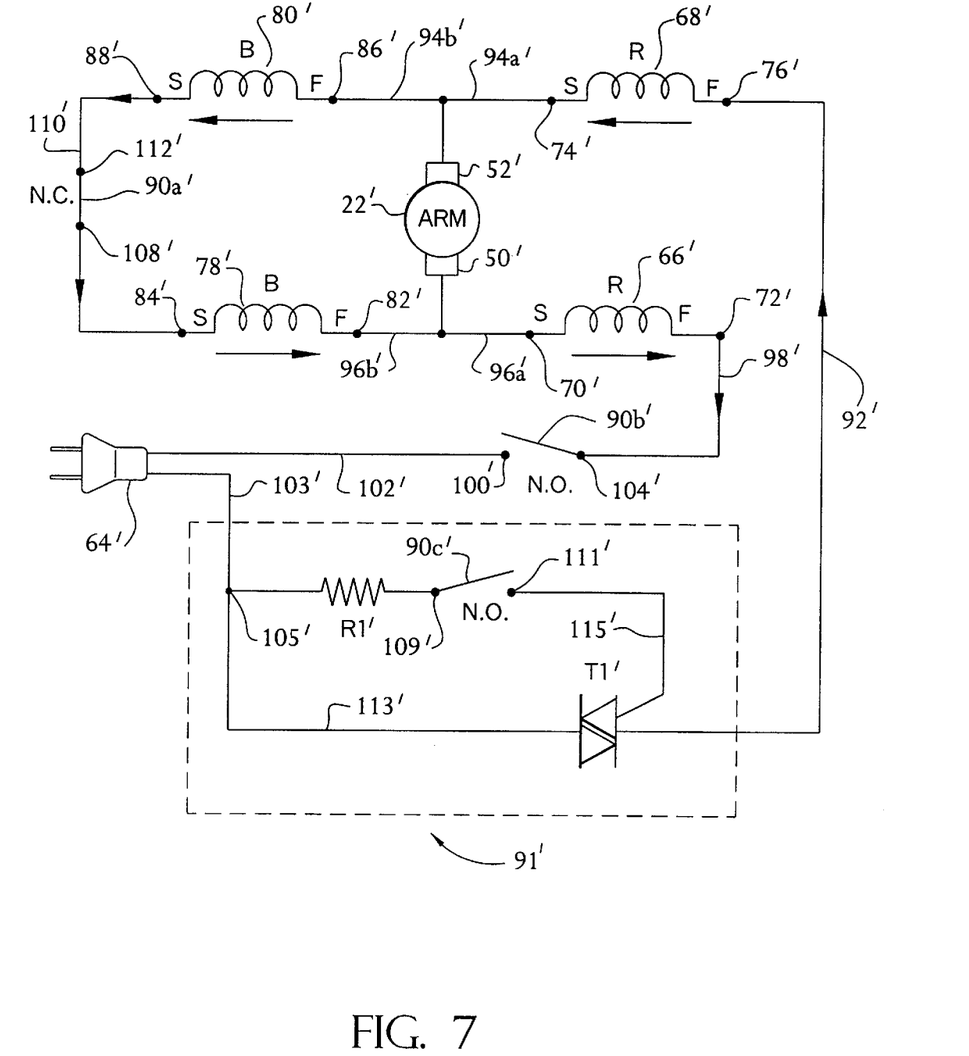
FIG. 7 is an alternate wiring schematic of the second embodiment.

FIG. 7 is the same circuit as shown in FIG. 6. The only difference is that the switches 90a', 90b' and 90c' have been separated.

FIGS. 4 through 7 illustrate a preferred switching circuit 91, 91'. Switching circuit connections are respectively completed by suitable conductors as follows: 103, 103' from power supply 64, 64' to node 105, 105'; R1, R1' is disposed between node 105, 105' and switch terminal 109, 109'; 113, 113' from node 105, 105' to thyristor T1, T1'; 115, 115' connect the switch terminal 111, 111' to the thyristor trigger; and 92, 92' connect the thyristor output to second run winding second termination 76, 76'.

For miter saw applications, R1, R1' should preferably be about 390 ohms and have a rating of 0.5 watts. In addition, the thyristor T1, T1' can be an appropriate thyristor having a rating of 16 A, 400 V. One such thyristor is manufactured by SGS-Thomson, Part Number BTB16-600BW.

Persons skilled in the art should recognize that the thyristor T1, T1' can be triggered by other means other than switch 90c, 90c'. For example, a computer can send a signal triggering the thyristor. Similarly, persons skilled in the art should recognize that means other than the thyristor can be used to gate any current flow.

To guarantee a residual flux level in the stator's field, the motor control switch 90, 90' is preferably manufactured so that the three switches 90a, 90b, 90c, and 90a', 90b', 90c', open and close according to a predetermined temporal order. For example, when a user releases the motor control switch 90, 90' (which is shown in FIGS. 4 through 7 in its normal off or braking position), switch 90c, 90c' opens before switch 90b, 90b' opens. When the switch 90c, 90c' opens, it signals that the switch 90b, 90b' will open after a predetermined time. This signal is used to gate the thyristor T1, T1' off. At the subsequent line zero cross, the thyristor T1, T1' commutates off at the current zero cross. This guarantees a residual flux in the stator field.

A person skilled in the art will note the delay occurring between the time when the switch 90c, 90c' opens and the time when switch 90b, 90b' opens. This delay should be long enough to allow the thyristor T1, T1' to commutate off at the current zero cross.

When the switch 90b, 90b' opens, the switch 90a, 90a' closes, engaging the brake windings 78, 80. Brake current is thus initialized due to the residual flux in the stator's field.

In the presence of the residual magnetic field in the stator (from the run condition) regenerative direct current reversal is produced through the armature and field windings. This current flow is in the direction of reversing armature rotation and its effect is to slow and stop the armature. Rotation is stopped more quickly than if the tool was allowed to "coast" to a stop relying only on windage and friction.

The switching circuit 91, 91' is also advantageous for several other reasons. First, the residual flux is usually above the no-load level, allowing for better control of the braking current. This helps control braking currents and extend brush life.

Further, because a thyristor is used to turn the motor current on and off, the motor control switch 90 does not make or break the main motor current. This extends switch life because of lack of arcing.

For a miter saw application, when the user releases the motor control switch 90, 90', switch 90c, 90c' preferably opens between about 10 milliseconds and about 500 milliseconds before switch 90b, 90b' opens to maintain short braking times. Further, switch 90a, 90a' closes within about 100 milliseconds from the time switch 90b, 90b' opens to insure controlled braking.

While not necessary for proper usage of the invention, it may also be advantageous to introduce a temporal delay between the time when the user closes the motor control switch 90, 90', and the time when switch 90c, 90c' closes. Preferably, switch 90a, 90a' would open before switch 90b, 90b' closes to insure proper start-up of the motor.

Further, switch 90b, 90b' closes before switch 90c, 90c' closes to insure that switch 90b, 90b' never makes the main motor current. In other words, because the switch 90c, 90c' is open, no current can flow through the thyristor T1, T1' or switch 90b, 90b'. Current will only flow through switch 90b, 90b' once the thyristor T1, T1' is gated on by switch 90c, 90c'. For a miter saw application, switch 90c, 90c' closes within about 150 milliseconds after switch 90b, 90b' closes. Again, because the thyristor T1, T1' is used to turn the motor current on and off, the switch 90b, 90b' does not make or break the main motor current. Its life is accordingly extended because of lack of arcing.

Figure 8:
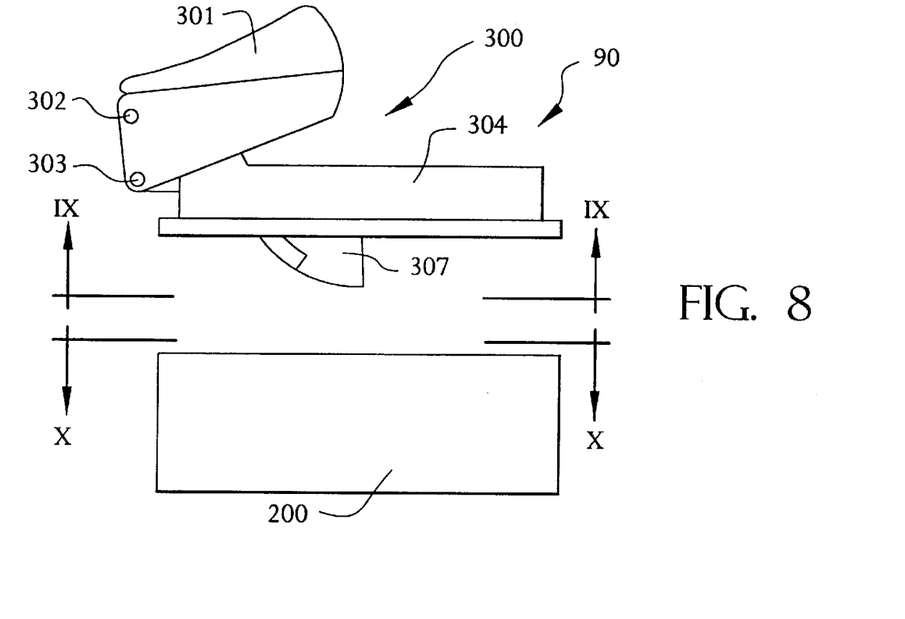
FIG. 8 is a left side view of a control switch in accordance with the present invention.

Another aspect of the invention includes the control switch 90, 90'. As mentioned above, the control switch is preferably a triple single-pole single-throw switch. FIG. 8 shows an embodiment of such switch. The switch 90 has two main components: switch contact housing 200 and switch contact trigger mechanism 300.

Figure 10:
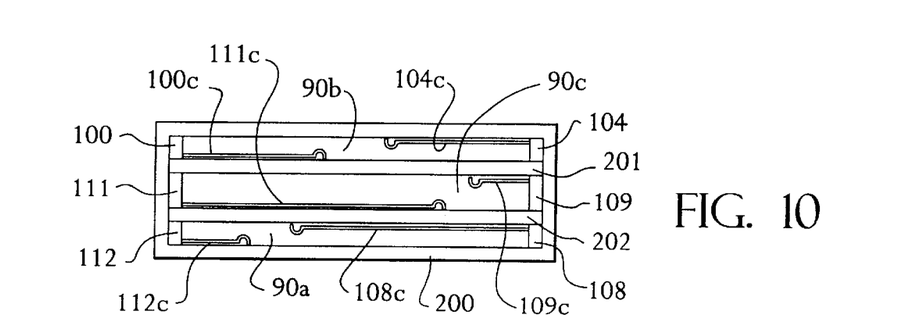
FIG. 10 is a top plan view of the control switch along the line X—X of FIG. 9.

Referring to FIG. 10, the switch contact housing 200 houses the corresponding contact terminals (108 and 112) for the switch 90a, as well as the terminal extensions (108c and 112c). The switch 90a will be closed when an auxiliary contact connects both terminal extensions 108c and 112c, as described below. Similarly, the housing 200 houses the contact terminals (100 and 104; 109 and 111 ) and terminal extensions (100c and 104c; 109c and 111c) for switches 90b and 90c, respectively. Walls 201 and 202 made of insulate material, such as plastic, ensure that the terminal extensions do not contact the terminal extensions of another switch.

Figure 11:
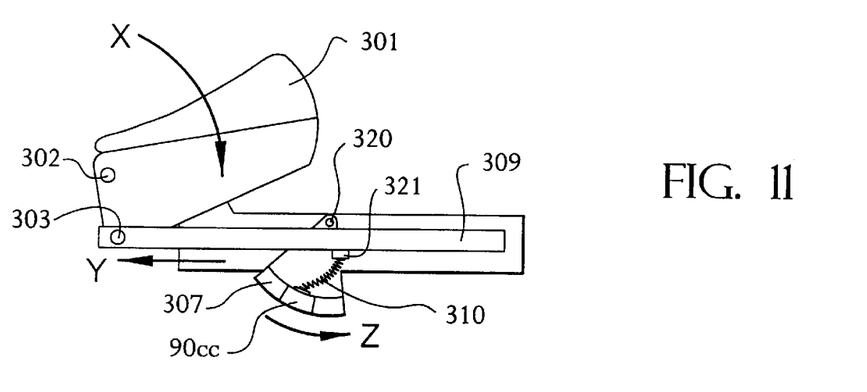
FIG. 11 is a cross-sectional left side view of the control switch along the line XI—XI of FIG. 9.

Referring to FIG. 8, the switch contact trigger mechanism 300 has a trigger 301, which is pivotally attached to the cover housing 302. A pin 302 can be used for this pivotal connection. The trigger 301 would thus pivot about pin 302. In addition, the trigger 301 is pivotally attached to a sliding bar 309 (FIG. 11). A pin 303 can be used for this pivotal connection.

Referring to FIGS. 8 and 11, the switch contact trigger mechanism 300 also has an overcenter mechanism which includes a moving contact base 307 pivotally attached to the cover housing 302. A pin 320 can be used for this pivotal connection. The contact base 307 would thus pivot about pin 320. In addition, a spring 310 is fixedly attached to the sliding bar 309 at attachment 321 and to the contact base 307. The operation of the overcenter mechanism will be described below.

Figure 9:
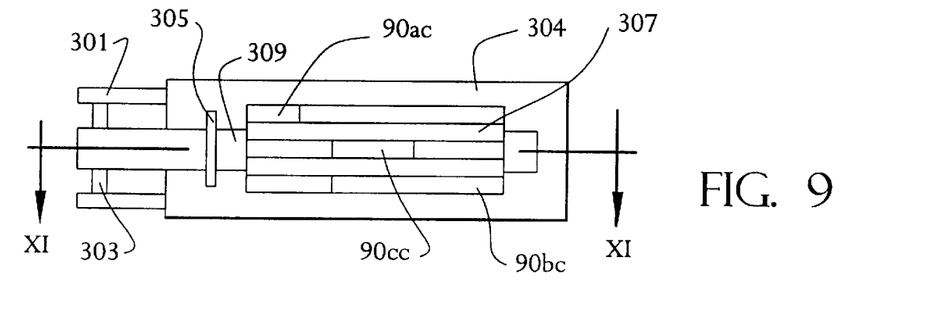
FIG. 9 is a bottom plan view of the control switch along line IX—IX of FIG. 8.

Referring to FIG. 9, the contact base 307 has three auxiliary contacts (90ac, 90bc, 90cc). When the contact base 307 is pivoted, these auxiliary contacts bridge the corresponding terminal extensions in order to close the respective switch, or break the contact with the corresponding terminal extensions in order to open the respective switch.

Referring to FIG. 11, when the trigger 301 is pressed, the trigger 301 pivots about pin 302 in direction X. Because the trigger 301 is pivotally connected to the sliding bar 309, the sliding bar 309 moves horizontally in direction Y. A retainer 305 (FIG. 9) assists in ensuring the linear motion of the sliding bar 309.

Figure 12:
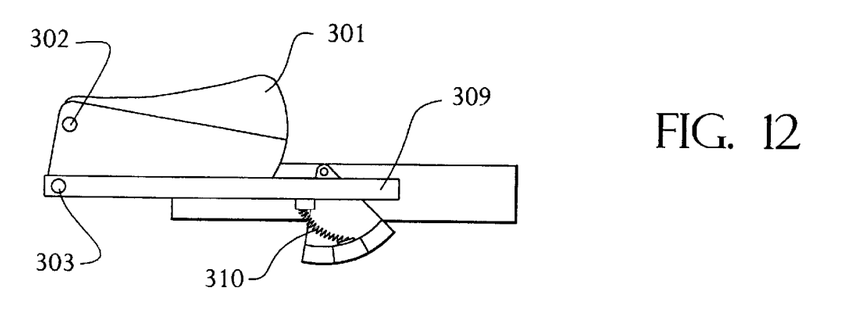
FIG. 12 is a cross-sectional left side view of the control switch after actuation of the switch.

As the sliding bar 309 moves in direction Y, the spring 310 is compressed until the attachment 321 passes underneath pivot 320. The spring 310 then forces the contact base 307 to pivot about pin 320 in direction Z. FIG. 12 illustrates the position of the different components once the contact base 307 has pivoted.

As the contact base 307 pivots, the auxiliary contacts 90ac, 90bc, 90cc slide in and out of contact with the respective terminal extensions, closing or opening the corresponding switches. By selecting the relative length and position of the auxiliary contacts, and the relative position of the terminal extensions, the sequence and timing of the switches may be optimized to provide the desired timing within the tolerance parameters of the mechanical components.

For example, referring to FIGS. 9 and 10, in the illustrated state, the auxiliary contact 90ac bridges the terminal extensions 108c and 112c, closing switch 90a. As the contact base 307 pivots in direction Z, switch 90a is opened because the auxiliary contact 90ac has slid out of contact with the terminal extensions 108c and 112c.

In addition, switch 90b is then closed because the auxiliary contact 90bc has slid into contact with the terminal extensions 100c and 104c. As the contact base 307 continues pivoting about pin 320, switch 90c will then be closed because the auxiliary contact 90cc has slid into contact with the terminal extensions 109c and 111c. Person skilled in the art will note that the length and position of auxiliary contact 90bc relative to auxiliary contact 90cc, as well as the length of the terminal extensions 100c and 104c relative to the terminal extensions 109c and 111c, will ensure that switch 90b closes before switch 90c.

Furthermore, by selecting the K-value of the spring 310, the rotational velocity of the contact base 307 can be increased or decreased to provide the desired timing within the tolerance parameters of the mechanical components. A second spring can also be disposed on the sliding bar 309 between the retainer 305 and the contact base 307 if necessary.

Persons skilled in the art may recognize other alternatives to the means disclosed herein, such as having a computer trigger other switching devices instead of using motor control switch 90, 90'. However, all these additions and/or alterations are considered to be equivalents of the present invention.

We claim:

1. A braking circuit for braking an electric motor comprising an armature, first and second run windings and a first brake winding, the braking circuit comprising:

a first switch disposed between a source of electrical power and the first run winding, the first switch being operable to disconnect the first run winding from the source of electrical power;

a semiconductor device disposed between the source of electrical power and the second run winding;

a second switch connected to the source of electrical power for changing status of the semiconductor device, the second switch changing the status of the semiconductor device after a first predetermined period of time has elapsed from the disconnection of the first run winding; and a third switch being operable to connect the first brake winding in order to brake the electric motor, wherein the first brake winding is connected after a second predetermined period of time has elapsed from the status change of the semiconductor device.

2. The braking circuit of claim 1, wherein said third switch is disposed between the first brake winding and the armature.

3. The braking circuit of claim 1, wherein the semiconductor device is a thyristor.

4. The braking circuit of claim 1, wherein the first predetermined period of time is between about 10 milliseconds and about 500 milliseconds.

5. The braking circuit of claim 1, wherein the second predetermined period of time is between 0 milliseconds and about 100 milliseconds.

6. A saw comprising:

an electric motor comprising an armature, first and second run windings and a first brake winding;

a first switch disposed between a source of electrical power and the first run winding, the first switch being operable to disconnect the first run winding from the source of electrical power;

a semiconductor device disposed between the source of electrical power and the second run winding;

a second switch connected to the source of electrical power for changing status of the semiconductor device, the second switch changing the status of the semiconductor device after a first predetermined period of time has elapsed from the disconnection of the first run winding; and a third switch being operable to connect the first brake winding in order to brake the electric motor, wherein the first brake winding is connected after a second predetermined period of time has elapsed from the status change of the semiconductor device.

7. The saw of claim 6, wherein said third switch is disposed between the first brake winding and the armature.

8. The saw of claim 6, wherein the semiconductor device is a thyristor.

9. The saw of claim 6, wherein the first predetermined period of time is between about 10 milliseconds and about 500 milliseconds.

10. The saw of claim 6, wherein the second predetermined period of time is between 0 milliseconds and about 100 milliseconds.

11. The saw of claim 6, further comprising a blade driven by the motor.

12. The saw of claim 6, further comprising a base.

13. The saw of claim 12, wherein the motor is supported by the base.

14. The saw of claim 12, wherein the motor is movably supported by the base.

15. The saw of claim 12, wherein the base further comprises a table.

16. The saw of claim 6, wherein the saw is a miter saw.

17. A starting circuit for starting an electric motor comprising an armature, first and second run windings and a first brake winding, the starting circuit comprising:

a first switch being operable to disconnect the first brake winding;

a second switch disposed between a source of electrical power and the first run winding, the second switch being operable to connect the first run winding to the source of electrical power after the disconnection of the first brake winding;

a semiconductor device disposed between the source of electrical power and the second run winding; and a third switch connected to the source of electrical power for changing status of the semiconductor device, the third switch changing the status of the semiconductor device after a predetermined period of time has elapsed from the connection of the first run winding.

18. The starting circuit of claim 17, wherein said first switch is disposed between the first brake winding and the armature.

19. The starting circuit of claim 17, wherein the semiconductor device is a thyristor.

20. The starting circuit of claim 17, wherein the predetermined period of time is between 0 milliseconds and about 150 milliseconds.

21. A saw comprising:

an electric motor comprising an armature, first and second run windings and a first brake winding;

a first switch being operable to disconnect the first brake winding;

a second switch disposed between a source of electrical power and the first run winding, the second switch being operable to connect the first run winding to the source of electrical power after the disconnection of the first brake winding;

a semiconductor device disposed between the source of electrical power and the second run winding; and a third switch connected to the source of electrical power for changing status of the semiconductor device, the third switch changing the status of the semiconductor device after a predetermined period of time has elapsed from the connection of the first run winding.

22. The saw of claim 21, wherein said first switch is disposed between the first brake winding and the armature.

23. The saw of claim 21, wherein the predetermined period of time is between 0 milliseconds and about 150 milliseconds.

24. The saw of claim 21, further comprising a blade driven by the motor.

25. The saw of claim 21, further comprising a base.

26. The saw of claim 25, wherein the motor is supported by the base.

27. The saw of claim 25, wherein the motor is movably supported by the base.

28. The saw of claim 25, wherein the base further comprises a table.

29. The saw of claim 21, wherein the saw is a miter saw.

30. The saw of claim 21, wherein the semiconductor device is a thyristor.

* * * * *